United States Patent [19]

Kaneda et al.

[11] Patent Number: 4,592,638
[45] Date of Patent: Jun. 3, 1986

[54] AUTOMATIC FOCUS ADJUSTING DEVICE

[75] Inventors: Naoya Kaneda; Kazuya Matsuda, both of Kanagawa, Japan

[73] Assignee: Canon Kabushiki Kaisha, Tokyo, Japan

[21] Appl. No.: 646,630

[22] Filed: Aug. 31, 1984

[30] Foreign Application Priority Data

Sep. 3, 1983 [JP] Japan ................................ 58-162257
Sep. 3, 1983 [JP] Japan ................................ 58-162258
Sep. 3, 1983 [JP] Japan ................................ 58-162259
Oct. 22, 1983 [JP] Japan ................................ 58-198007

[51] Int. Cl.⁴ .......................... G03B 3/00; H04N 5/38
[52] U.S. Cl. ................................... 354/403; 358/227
[58] Field of Search ................................ 354/400–403; 358/227; 352/140; 250/201 AF

[56] References Cited

U.S. PATENT DOCUMENTS

3,617,633 11/1971 Barr et al. ........................... 358/227
3,813,679 5/1974 Hasegawa et al. .................. 354/403
4,410,261 10/1983 Masunaga et al. ............. 354/403 X
4,464,038 8/1984 Namba et al. ....................... 354/403

Primary Examiner—William B. Perkey
Attorney, Agent, or Firm—Toren, McGeady, Stanger, Goldberg & Kiel

[57] ABSTRACT

The disclosed automatic focus adjusting device includes both an active type range finder and a passive type range finder. A selecting arrangement responds to a signal representing the position of a focusing lens and causes operation of either the first or the second range finder. Preferably, the active type range finder is operative when the system is actuated.

7 Claims, 16 Drawing Figures

AUTOMATIC FOCUS ADJUSTING DEVICE

BACKGROUND OF THE INVENTION

1. Field of the Invention

This invention relates to automatic focus adjusting devices for use in still cameras, video cameras and the like.

2. Description of the Prior Art

Various range finding devices have been proposed for automatic focus adjusting devices. Auto-focus devices are now even available in the video camera market. As is well known in the art, the range finders employing these facilities may be divided into the so-called active type and passive type. The active type of automatic focus adjustment projects light or sound from the camera onto an object to be photographed and uses the reflection as an information source. In common photographic situations, a subject at a range of distance from a minimum to, for example, 10 meters, produces an effective signal for obtaining the object distance. For an object beyond that range, however, the range finder does not operate reliably because the reflected light or sound level is too low.

In the art of video cameras equipped with the active type automatic focus adjusting device, when the reflection of the projected light or sound is not sensed because the object distance is too long, it has been the common practice to stop the focus-adjusting lens component of the photographic objective at a prescribed position. The maximum object distance at which the reflection of the projected light or sound is just detectable may be regarded as a "boundary" distance. Where this boundary distance is longer than a near point of the hyperfocal distance, the object falls within the depth of field regardless of the position of the object between a minimum and infinity. Therefore no problem arises.

For example, in a 35 mm camera having a focal length f=35 mm, F-number=2.8 at full open aperture, and a disc of least confusion $\delta$=0.03, the near point of the hyperfocal distance is found to be H/2=f$^2$/2($\delta$f)=7.3 meters. If the boundary distance is taken at 10 meters, automatic focus adjustment is possible throughout the entire focusing range. However, for a video camera of f=60 mm, F/1.8 at full open aperture, and a disc of least confusion $\delta$=0.03 mm, H/2 is found to be 33 meters. This means that it is very difficult to realize a camera having reliable focusing control throughout the entire focusing range given the available sorts and sizes of electrical elements.

Though a majority of the prior known active type range finders can be practically used in most photographic situations, focusing has to be performed manually in some situations where the diaphragm aperture is relatively near fully open, for example, a distant view of fireworks or neon signs at night. For example, in the aforesaid video camera having the lens of f=6 mm, assuming the boundary distance of light or sound is 10 meters, from 10,000=60$^2$/2(0.03F), we obtain F=6. The use of a diaphragm aperture opening larger than F6 will often result in defocused photographs.

Conversely, the passive type automatic focus adjusting device is, in principle, reliable only when the object to be photographed has some distinguishable contrast. For this reason, there is the drawback that the device is unable to measure the distance in situations where the object is a wall having no contrast, or the like, or where, because of low illumination, a difference in the contrast is indiscernible. However, as opposed to the active type, the passive type, when applied to objects of distinguishable contrast, is able to measure the distance accurately no matter how long the object distance may be. In conclusion, the active type range finder is more effective for the shorter half of the focusing range, while the passive type is more effective for the longer half. Moreover, these two types can be said to compensate for each other's drawbacks.

For such reasons, the employment of both the active and passive type range finders in a single camera is known. In the prior art, however, the hyperfocal distance and the boundary distance have not sufficiently been taken into account. As the diaphragm is relatively closed down, the photographic objective is stopped at the hyperfocal distance for that aperture size or the full open aperture. Thus, even in the in-focus condition, the passive type range finder continues operating and measuring the distance. As a result, the objective executes fine excursions so that an unpleasant photograph of a moving body is taken. Also, in panning photography, when a scene of little contrast appears in the field of view of the finder, the passive type range finder automatically switches to the so-called search mode, with the result that the objective is moved a large distance. Thus, in some cases, the use of the conventional dual-method dependent automatic focus adjusting device in shooting a moving body provides worse pictures.

SUMMARY OF THE INVENTION

A first object of the present invention is to provide an automatic focus adjusting device operating with selection of an optimum of modes depending on the kind of the focusing lens and the photographic situation, and particularly to provide a focus adjusting device having first range finding means of the active type and second range finding means of the passive type with means rendering selectively operative the two range finding means in response to shooting conditions.

A second object of the present invention is to provide a novel selector means for the first and second range finding means in the focus adjusting device described in connection with the first object.

A further object of the present invention is to provide a device having first range finding means of the active type and second range finding means of the passive type in which the passive type or second range finding means is periodically rendered operative for a predetermined time interval to achieve high reliability and accuracy of focusing control.

BRIEF DESCRIPTION OF THE DRAWINGS

The drawings illustrate embodiments of the automatic focus adjusting device according to the present invention in which:

FIGS. 5(a) to 5(e) are waveforms illustrating a manner in which the passive type range finder of FIG. 4 operates.

DESCRIPTION OF THE PREFERRED EMBODIMENTS

The present invention will next be described in great detail in connection with embodiments thereof by reference to the drawings.

Figure 1:
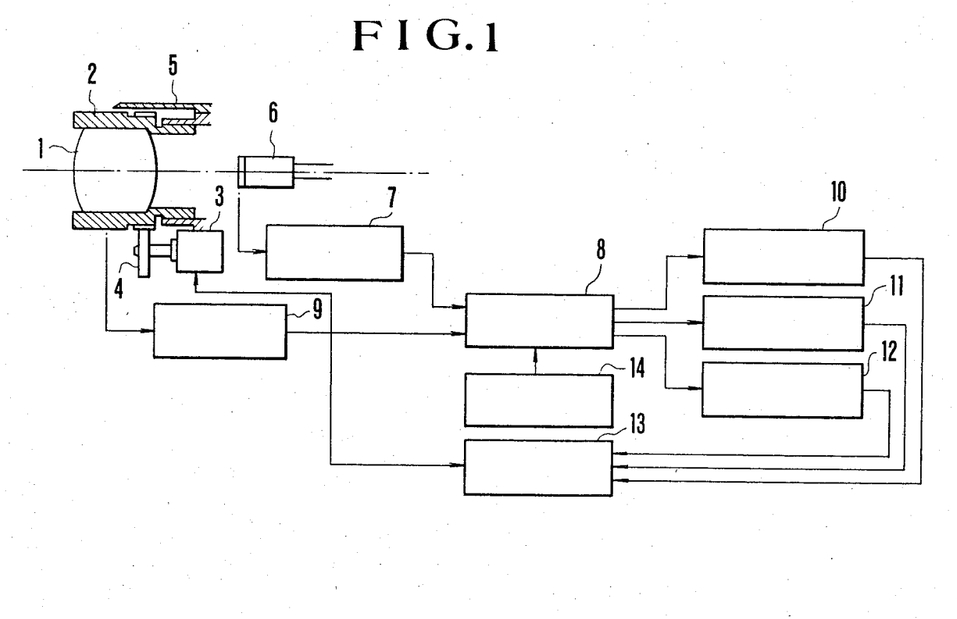
FIG. 1 is a block diagram of a first embodiment of a circuit according to the invention.

FIG. 1 illustrates the outline of a system of the first embodiment of the invention. A photographic objective 1 is held in a distance adjusting ring 2. This photographic lens 1, in more detail, that lens component which contributes to focusing adjustment, is driven by an electric motor 3 with a gear 4 to move axially relative to a stationary barrel 5. An image pickup tube 6 receptive of an object image formed by the photographic lens 1 produces television signals which are then applied to a processing circuit (not shown). The size of opening of the diaphragm aperture for the image pickup tube 6 is sensed by an object brightness sensor circuit 7. An output or brightness signal EV from circuit 7 is applied to a sequencer 8 which serves as selecting means. The position of the photographic lens 1 is also sensed by a position sensing circuit 9. The output from circuit 9 is applied to the sequencer 8, and is combined in the sequencer 8 with the brightness signal EV. The output of the sequencer 8 is connected to render operative one of an active range finder 10 which serves as the first range finding means, a passive range finder 11 which serves as the second range finding means, and a fixed focal distance setting device 12. The outputs of these parts 10, 11 and 12 are connected through a motor drive circuit 13 to control motion of the motor 3. A signal from a timer means 14 is applied to the sequencer 8 according to necessity, so that the operation of sequencer 8 is controlled by taking into account whether or not the timer signal is present.

The object brightness sensing circuit 7 operates so that when the object is brighter than a prescribed threshold value N, a logic signal "0" is produced, and when dimmer, "1" is produced. This brightness signal may be obtained from switch means arranged to open or close when the diaphragm is closed down or opened up across a prescribed aperture value, with the diaphragm blade or a meter needle operatively connected to the switch means.

The lens position sensing means 9 operates so that when the stopped position of the focusing lens is nearer than a prescribed distance, a logic signal "0" is produced, and when longer, "1" is produced.

Therefore, information from the brightness sensing circuit 7 and the position sensing circuit 9 are both applied to the sequencer 8, and, as a result of a judgement within sequencer 8, either one of the active range finding device 10, the passive range finding device 11 and the fixed focus device 12 for holding a fixed prescribed stopping position is selected. By the corresponding command of the motor drive circuit 13 in response to the output of the selected device, the electric motor 3 adjusts the position of the photographic lens 1 through the gear 4 so that an image of the object forms on the image receiving surface of the image pickup tube 6 in the in-focus condition.

In this first embodiment, the brightness information and the lens position information are used to form the judgement of whether the active range finding device or the passive range finding device is used. As will be described later, the fixed focus device 12 for holding the photographic lens 1 at the fixed focus may be considered to be included within the active range finding device 10. Here, the role of the timer means 14 is that when the mode becomes passive range finding, a defect to be described later will result if range finding only by the passive type continues. Therefore, this is prevented in such a way that during the operation of the passive range finding device 11, the active range finding device is driven for a prescribed period of time. Further, the timer means 14 also plays another role of timing adjustment as the termination of the operation of the fixed focus device 12 is changed over to the active range finding device 10.

As illustrated in FIG. 1, in the present embodiment, the active range finding device 10 is rendered operative for the object at a shorter distance, and the passive range finding device 11 is rendered operative for the object at a longer distance. The system, is provided with the lens position information and further the object brightness information corresponding to the aperture information. In some cases, for a long distant object, no range finding operation by the passive range finding device 11 is performed and, instead, the lens is stopped in a prescribed position. Table 1 shows range finding modes related to combinations of the object conditions. In this embodiment, the photographic lens 1 has "far distance positions" and "near distance positions", or two regions of positions, with a prescribed object distance as the boundary, which are distinguishably sensed by the position sensing circuit 9. As to the brightness information, taking a prescribed size of aperture opening as the boundary, the brightness sensing circuit 7 can distinguish "bright situations" and "dim situations" from each other.

TABLE 1

| Lens Position | Brightness | Mode |
| --- | --- | --- |
| Far Distance | Dim | Passive |
| Far Distance | Bright | Fixed Focus |
| Near Distance | Dim | Active |
| Near Distance | Bright | Active |

As shown in Table 1, for a dim object at a far distance, the diaphragm opens wide, and, as the hyperfocal distance $f^2/(\delta F)$ (where f is assumed to be constant at the telephoto end) is so large that it exceeds the distance the projected light can reach, it is, therefore, optimum to perform the range finding operation in the passive mode. For with a bright object at a far distance, in the case of, for example, the aforesaid video camera, when the diaphragm stops down below F6, there is no need to operate in the passive mode, and the lens is stationed at a position where the hyperfocal distance is taken as the in-focus distance. When the object distance is shorter than the boundary distance, the active range finding mode is operated regardless of what size the opening of the diaphragm aperture takes. The sequencer 8 for controlling these operations can be realized by hardware in the form of a logic circuit, but, in the present case, as will be described later, it operates by software.

Figure 2A:
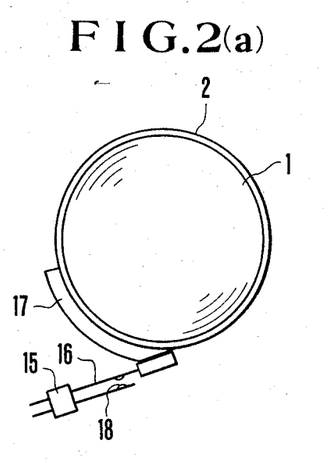
FIGS. 2(a) and 2(b) are front elevational views of an arrangement of the distance detecting means.
Figure 2B:
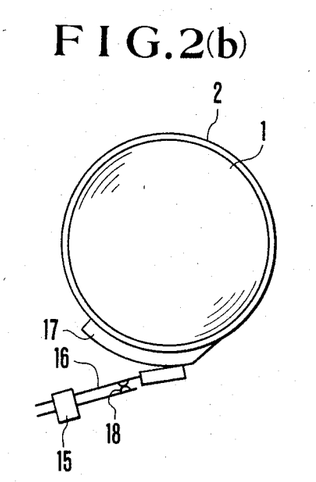

FIGS. 2(a) and 2(b) illustrate a practical example of the position sensing circuit 9 for sensing lens-stopped position information. A movable contact 16 of a leaf switch 15 drives in abutting engagement on a cam portion 17 provided as a unit with the outer periphery of a distance adjusting ring 2 holding the photographic objective lens 1 and comes to contact a fixed contact 18. In FIG. 2(a), the switch is open. In FIG. 2(b), as the distance adjusting ring 2 turns, the cam portion 17 pushes the movable contact 16 down, thereby closing the switch. The thus-detected two positions may be taken in FIG. 2(a) as the near distance region and in FIG. 2(b) as the far distance region. As a distance of the switching point between these two positions, the boundary distance of the light or the like of the active range finding device 10 or thereabout may be taken, or according to another design intention, for example, the boundary distance may be taken as the near point at the full open aperture in the telephoto end.

Figure 3:
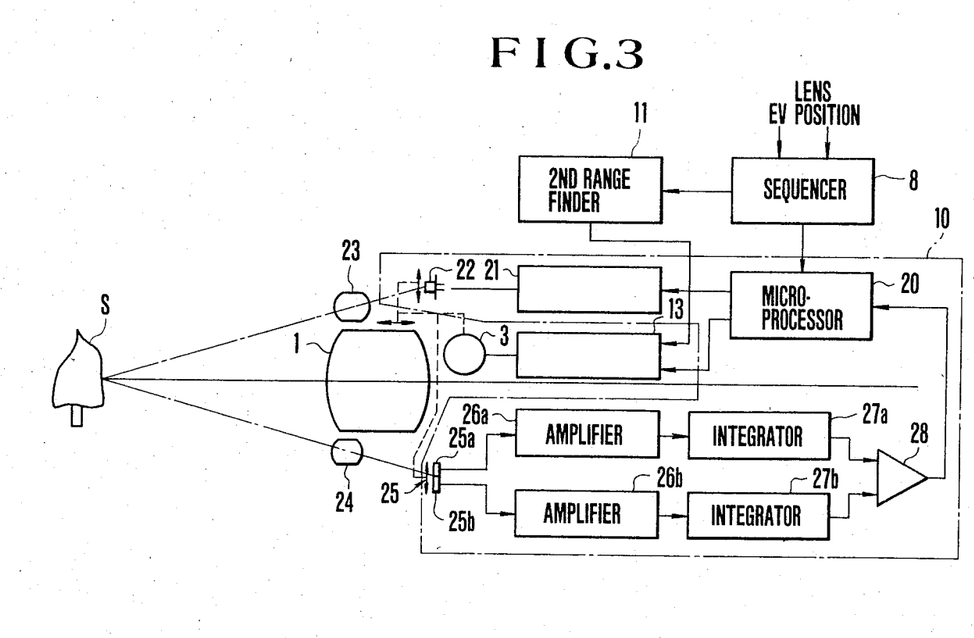
FIG. 3 is a block diagram of an active type range finder used in the first embodiment.

FIG. 3 illustrates the first range finding means in the form of the active range finder device 10 suited to be used in the present embodiment. In the present embodiment, it is of course possible to use any other type of active range finding device than that shown here. In FIG. 3, on command from the sequencer 8, a microprocessor 20 commands an infrared light drive circuit 21 to emit pulsated light having a constant period, and an infrared light emitting diode 22 periodically projects near infrared light through a projection lens 23 toward an object field. The projected light rays are irregularly reflected from an object S and focus an image on a light receiving element 25 through a collection lens 24. At this time, FIG. 3 shows an in-focus position where the light beam on the light receiving element 25 focuses an image having a center at the boundary between two regions 25a and 25b. Therefore, the difference between the outputs A and B of the regions 25a and 25b or the output difference (A−B) is zero. For example, as the object S is approaching the camera, the spot center on the light receiving element 25 moves toward the region 25b and increases the output B. Therefore, (A−B) <0 results, meaning a far focus. In the case of a near focus, this is reversed. The signals A and B, after having been amplified by amplifiers 26a and 26b, respectively, are deprived of alternating noise components by integrators 27a and 27b and then applied to a difference amplifier 28. The difference signal (A−B) is treated by microprocessor 20 to determine the direction of rotation of the electric motor 3. For example, for a far focus, the photographic lens 1 moves to the left as viewed in FIG. 3 until the optical axes of the projection and collection lenses 23 and 24 intersect each other at a new object distance.

Figure 4:
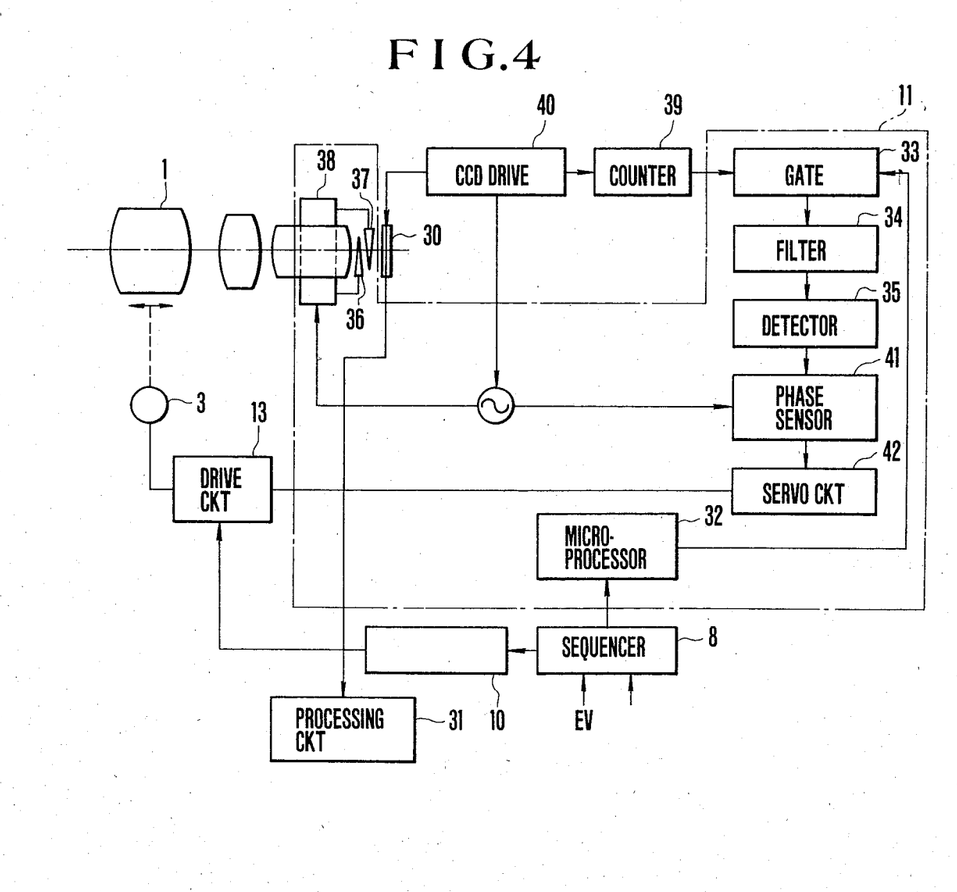
FIG. 4 is a block diagram of a passive type range finder used in the first embodiment.

FIG. 4 illustrates the second range finding means in the form of the passive range finder 11 suited to be used in the present embodiment. Here, the output of a solid state image pickup element 30 such as a CCD, corresponding to the image pickup tube, is processed by a circuit including a pre-amplifier, gamma corrector, blanking mixer and linear clipper to produce TV signals. That portion of this output which corresponds to the range finder area at the central portion of the image format is extracted for use in automatic focus adjustment by a gate 33 whose operation is controlled by a microprocessor 32. This output signal is passed through a high pass filter 34 and taken out by a detector 35.

Meanwhile, two optical elements of focus modulators 36 and 37 and a driver therefor in the form of a vibrator 38 receive a frame period signal from a counter 39 and a CCD drive 40 and in turn change the imaging position for each frame. As a result, a phase sensitive detector 41 for detecting the near focus or the far focus from the output of the detector 35 and the concurrent positions of the focus modulators 36 and 37 indicates the magnitude and direction of the focus error by the magnitude and sign of its output, and drives the electric motor drive circuit 13 through a focus servo circuit 42.

Figure 5A:
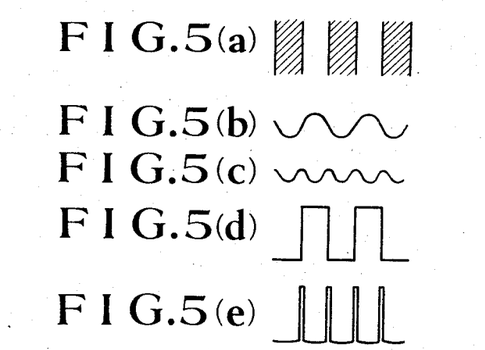

FIGS. 5(a) to 5(e) depict the principle of the passive range finding device of this method. FIG. 5(a) shows a contrast of the object. In an out-of-focus condition, a Y signal is as shown in FIG. 5(b) and its differential signal is only a small output as shown in FIG. 5(c). As opposed to this, in an in-focus condition, the Y signal is as shown in FIG. 5(d), and its differential signal shown in FIG. 5(e) has a far higher peak than that of the signal of FIG. 5(c). Therefore, a position at which the differential signal reaches the peak may be taken as the in-focus position.

Figure 6:
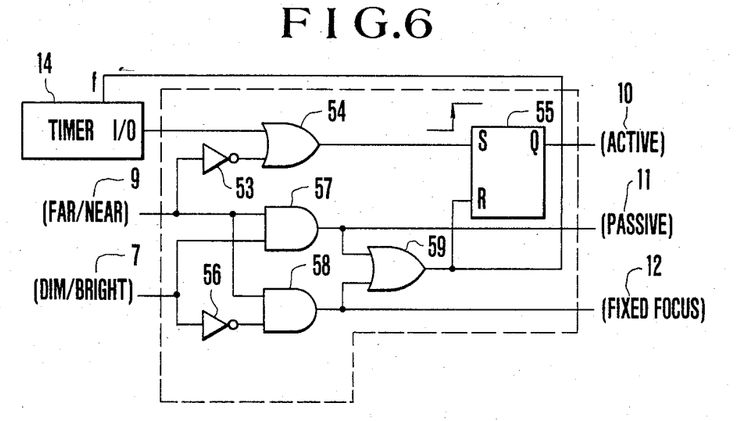
FIG. 6 is an electrical circuit diagram of the selecting means.

FIG. 6 illustrates the concrete circuit construction of the selecting means (sequencer 8) shown in FIG. 1.

The selecting means 8 comprises an inverter 56 receptive of the digital signal from the object brightness sensing circuit 7, another inverter 53 receptive of the digital signal from the lens position sensing means 9, OR gates 54 and 59, AND gates 57 and 58 and a set-reset flip-flop 55.

In FIG. 6, symbol 14 denotes timer means so constructed that at the time of actuation of the present automatic focus adjusting device, its output takes a digital logic signal "0", and then after a predetermined time, changes to another logic signal "1".

In the circuit of FIG. 6, the timer means 14, as has been described above, produces the logic signal "1" at the same time the device of the present invention starts to operate. Therefore, regardless of the output signal lens position sensing means 9 produces, the flip-flop 55 is set through the OR gate 54. Additionally, the Q signal of the flip-flop 55 produces an actuating signal for the first range finding means 10. For this reason, in the device of the present invention, at the time of actuation the active type range finding means is always rendered operative. When the lens position signal indicates a far object distance, and when the object brightness is low, the output of the AND gate 57 becomes "1". This gate signal enters the flip-flop 55, thereby resetting flip-flop 55 is reset. Thus, the actuating signal for the active range finding means 10 is prohibited from producing. The passive range finding means 11 is rendered operative by the gate output of the AND gate 57.

When the lens position sensing signal indicates a far object distance, and when the object brightness is high, the output signal of the AND gate 58 renders operative the fixed focus device. When either the passive range finding means or the fixed focus means 12 is in operation, the timer means 14 is reset by the output signal of the OR gate 59. The timer means 14, after having been reset, starts to count again and sets the flip-flop 55 through the OR gate 54, thereby again rendering operative the active range finding means.

Figure 7:
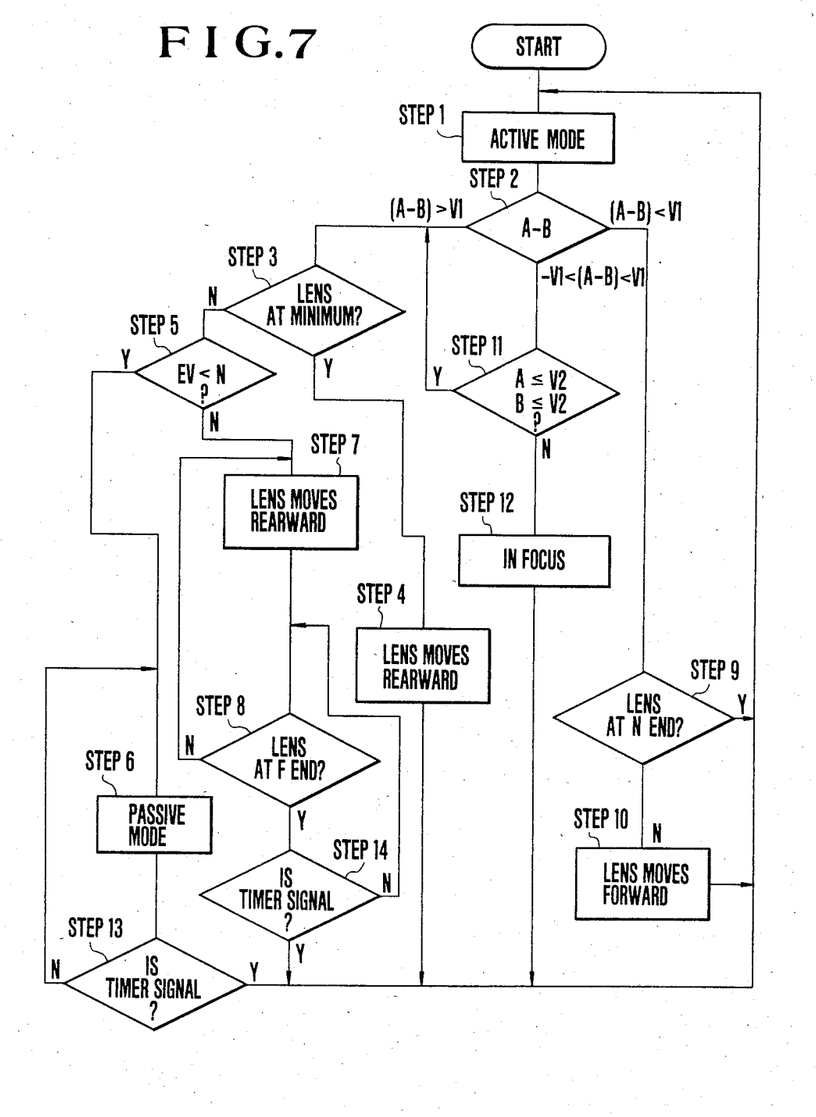
FIG. 7 is a flow chart for the first embodiment.

FIG. 7 is a flow chart of the present embodiment for operating the sequencer 8. Based on the brightness signal EV from the brightness sensing circuit 7 and the lens position information from the position sensing circuit 9, the program changes over the range finding mode, and also based on the outputs A and B from the light receiving element 25, the program moves the photographic lens 1 to the in-focus position. At a point in time when the range finding starts, as has been described above, the active range finding device 10 is rendered operative. Thus the range finding starts to operate in the active mode. As a reason for this, assume that just before making a shot, the photographic lens 1 lies at or near the limit of the focusing range for the infinitely distant object, that the object actually lies at or near the minimum distance and that the passive range finding mode is selected to operate. When something wrong occurs to make it impossible to measure the object distance in the passive mode, the photographic lens 1 stays in the hyperfocal distance or takes unfavorable action in the passive region until the output of the timer 14 of FIG. 1 sets the active range finding mode. Therefore, it takes a long time to reach the in-focus condition. However, if any shot begins with the active mode, this problem can be solved. Alternatively, assume that the photographic lens 1 lies near the minimum limit of the focusing range, and the object actually lies at a far distance. Then, even when the range finding in the active mode is impossible, the photographic lens 1 starts to move in a direction to effect focusing to longer object distances and switching to the other mode takes place. Therefore, there is no problem.

Therefore, when range finding starts, regardless of the brightness information and the lens position information, step 1 just follows so that the infrared light-emitting diode is lit and the active mode operates. As a result, if the output difference (A−B) from the two regions 25a and 25b of the light receiving element 25 is, in step 2, determined to be larger than a certain level V1, the focusing condition is judged as the near focus. If the photographic lens 1 is, in step 3, discriminated as being at the minimum from the lens position information, step 4 is executed so that for focusing purposes, the photographic lens 1 is moved rearward and further the active mode of step 1 continues. If in step 3, the photogrphic lens 1 is discriminated to be in the far region, the procedure advances to step 5. If the brightness value or EV is lower than a predetermined value N, step 6 is executed to perform the passive mode. If the EV is larger than the N, steps 7 and 8 are executed to perform the fixed focus mode.

Figure 8:
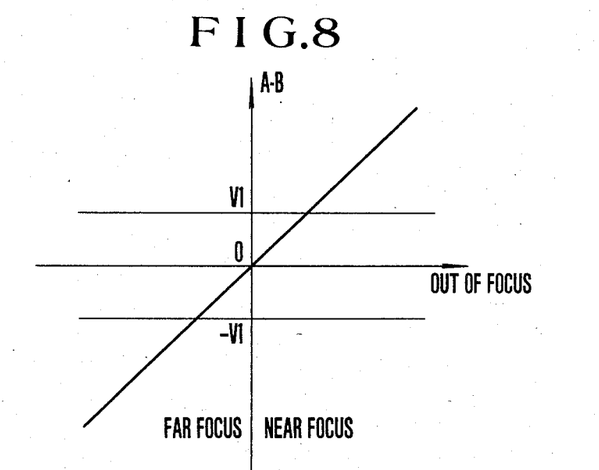
FIG. 8 is a graph explaining a blind area of the active type range finder of the first embodiment.

Meanwhile, in step 2, if (A−B) < −V1, the focusing condition is judged as the far focus. Then step 9 examines whether the photographic lens 1 is at a point N. If not, step 10 is executed so that for focusing purposes, the photographic lens 1 is moved forward, and the active mode of step 1 continues. As shown in FIG. 8, there is provided a blind zone whose width is determined so that a range −V1<(A−B)<V1 is judged to be in focus. Therefore, if (A−B) is in between −V1 and +V1 in step 2, and if the A and B are both higher than a certain level V2 in step 11, or there is reflected light from the object, the in-focus condition is established in step 12. Thus, an automatic focusing adjustment is by and large finished. However, when shooting a moving body, as the object distance is changing, the step 1 is executed again to recycle the active range finding operation. If, in step 11, A≦V2 and B≦V2, the procedure advances to step 3 where a decision of whether to go to step 4 or to advance to step 5 is made based on the lens position information.

During the range finding in the passive mode, step 13 discriminates whether or not there is a timer signal from the timer 14. If not, the passive mode continues. If there is the timer signal, the procedure retruns to the step 1 for the active mode. In other words, during the passive mode, the active range finding operation is performed intermittently for a period predetermined by the timer means 14. This is because, for example, a sudden appearance of an object of no contrast at the minimum distance during the aiming at a relatively distant object in the passive mode is prevented from resulting in the impossibility of range finding.

In the fixed focus mode, the steps 7 and 8 move the photographic lens 1 to an F end. In this fixed focus mode, the photographic lens 1 is not always required to move to the F end, and may be moved to the hyperfocal distance position. After the photographic lens 1 has moved to the F end, step 14 examines whether or not there is the timer signal from the timer means 14 If there is, the step 1 for the active mode is repeated. If there is not, the fixed focus mode continues. Actually, there is a time gap in the transition from the fixed focus mode to the active mode due to the timer 14. Thereby, unnecessary infrared light energy loss is avoided. The active mode as switched from the fixed focus mode is followed, if the conditions of the object do not change, after the step 2, step 11, step 3 and step 5, by returning to the fixed focus mode again. During this, therefore, no motion of the photographic lens 1 takes place at all.

Figure 9:
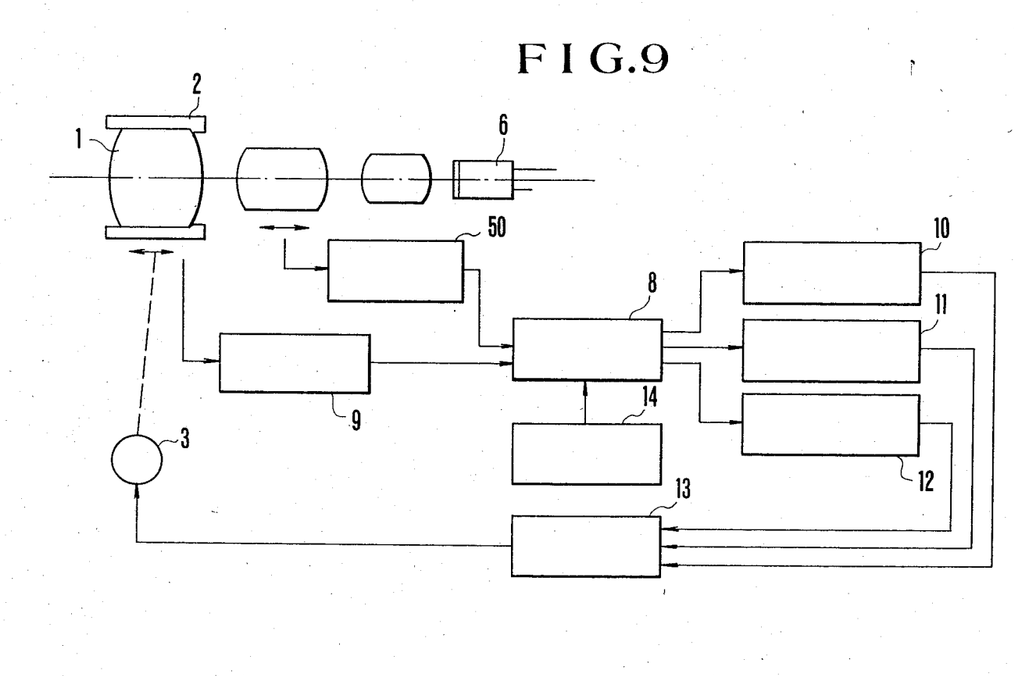
FIG. 9 is a block diagram of a second embodiment of the invention.

FIG. 9 illustrates a second embodiment using a zoom lens. In the preceding or first embodiment shown in FIG. 1, as the elements for selection of the active mode, passive mode and fixed focus mode, use is made of the position information of the distance adjusting ring 2 and the brightness information. The lens position information has the ON-OFF switching in-focus distance at, for example, the boundary distance in the active mode, as has been described above, f=60 mm, full open F.No. =1.8 and δ=0.03 mm for which the boundary distance is taken at 10 meters. The ON-OFF switching of the diaphragm is then near F6. Here, similarly, the boundary distance is taken at 10 meters, and F=1.8 is constant. From 10,000=f$^2$/2(0.03×1.8), we obtain f=33 mm. In the second embodiment of FIG. 9, therefore, based on this calculation, the focal length information of the zoom lens is turned on and off at 33 mm. As shown in Table 2 below, when the focal length information from the focal length sensing circuit 50 is on the wide angle side of this boundary, the fixed focus mode operates, while when on the telephoto side, the passive mode operates.

TABLE 2

| Lens Position | Focal Length | Mode |
| --- | --- | --- |
| Far Distance | Telephoto | Passive |
| Far Distance | Wide Angle | Fixed Focus |
| Near Distance | Telephoto | Active |
| Near Distance | Wide Angle | Active |

Figure 10A:
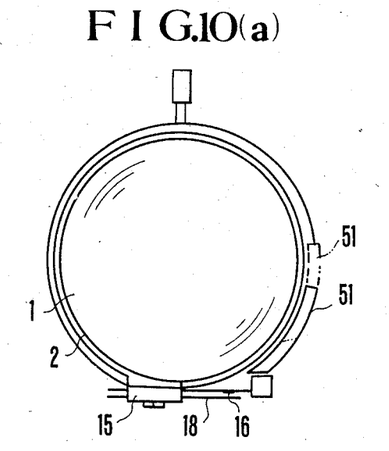
FIG. 10(a) is a lateral cross-section view of a focal length detecting mechanism used in the second embodiment.
Figure 10B:
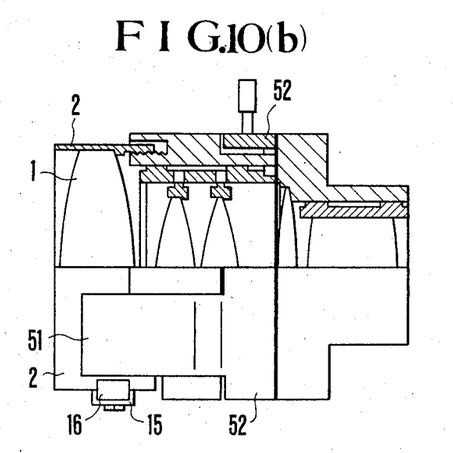
FIG. 10(b) is a longitudinal section view of the mechanism of FIG. 10(a).

FIGS. 10(a) and 10(b) illustrates a focal length sensing mechanism suited to be used in the second embodiment shown in FIG. 9. A leaf switch 15 for sensing the position of the distance adjusting ring 2 was, in the first embodiment, as shown in FIGS. 2(a) and 2(b), turned on and off in following up the cam portion 17 of the distance adjusting ring 2, and was fixedly secured to a certain place. Conversely, in this present embodiment, the leaf switch 15 is mounted on the distance adjusting ring 2 and rotates with the distance adjusting ring 2. A cam portion 51 for turning on and off this leaf switch 15 extends axially forward of a zoom actuator ring 52.

By this arrangement of the second embodiment, the in-focus distance at the boundary between the near and far regions of the distance adjusting ring 2 varies with variation of the focal length. This implies that in zooming to the wide angle positions, when the depth of field deepens, the active operating region is limited to a nearer side. On checking the above-described example, for focal lengths shorter than f=33 mm, the boundary point between the near and far distance regions is brought to a shorter distance. The use of such arrangement has advantages the greatest of which is that given the condition that with a small aperture size and in the wide angle positions the depth of field is increased, the futility is removed that an object in the depth of field continues to be measured is removed. In this case, when the diaphragm is open wide as compared with the first embodiment, the range finding region for the passive mode increases.

As has been described above, the automatic focus adjusting device according to the present invention, having both the active type and the passive type of automatic focus adjusting devices, improves the reliability and accuracy of range finding of the entire device by making the best use of each other's advantages.

What is claimed is:

1. An automatic focus adjusting device comprising:
   (a) a lens drive means for moving a focusing lens;
   (b) lens position detecting means having a switch to be closed and opened in accordance with the position of said focusing lens and for producing a logic signal showing whether said focusing lens is focused on a position shorter or longer than the determined distance in accordance with the closing and the opening of said switch;
   (c) first range finding means, said means including light-emitting means for emitting range finding light to an object to be photographed, light receiving means for receiving said range finding light reflected from an object, and control means for moving said focusing lens to an in-focus position on the basis of the output signal of said light receiving means;
   (d) second range finding means receptive of reflected natural light or indoor light from the object for producing an output signal based on the reflected light and for moving said focusing lens to an in-focus position;
   (e) selecting means for selecting the operation of one of said first and said second range finding means on the basis of a signal from at least said lens position detecting means; and
   (f) said selecting means having a gate means for receiving the logic signal from said lens position detecting means so as to select said first or said second range finding means in accordance with the position of said focusing lens.

2. An automatic focus adjusting device according to claim 1, further comprising:
   a brightness detecting circuit means for detecting the brightness of an object;
   said detecting means being arranged for producing a logic signal showing that the detected brightness is higher or lower than the designated brighness; and
   said selecting means having a gate means for receiving the logic signals from said lens position detecting means and said object brightness detecting means and said object brightness detecting means so as to selectively operate one of said first and second range finding means.

3. An automatic focus adjusting device according to claim 1, further comprising:
   a zoom lens optical system;
   focal length detecting means for detecting focus length information from said zoom lens optical system and producing a focal length information signal, said selecting means being arranged to receive said focal length information signal and said lens position signal to select said first or said second range finding means;
   said focal length detecting means having arranged for producing a logic signal for showing whether the detected length is larger or smaller than the focal length designated with said zoom lens optical system, said logic signal being applied to said selecting means; and
   said selecting means being arranged for producing a signal for selecting said first or said second range finding means in accordance with the signal from one of said lens position detecting means and said focal length detecting means.

4. An automatic focus adjusting device comprising:
   (a) lens drive means for moving a focusing lens;
   (b) first range finding means, said range finding means including light receiving means, having at least first and second adjacent light receiving areas, light emitting means for emitting light for range finding, and control means receptive of an output signal of said light receiving means for driving said lens drive means;
   (c) second range finding means for receiving reflected light of natural light or indoor light from an object to be photographed, and on the basis of said reflected light driving said lens drive means;
   (d) lens position detecting means for detecting a position signal of said focusing lens and for producing a digital signal corresponding to a position of said focusing lens;
   (e) object brightness detecting means for producing a digital signal corresponding to object brightness; and
   (f) selecting means for preferentially selecting said first range finding means at time when said automatic focus adjusting device starts to operate, and for performing selection of said first and second range finding means in response to said lens position detecting means on the basis of the position of said focusing lens.

5. A device according to any one of claims 1-4, further comprising:
   timer means for producing a timer signal for every predetermined period,
   said selecting means actuating said second range finding means for every predetermined period of said timer means.

6. An automatic focus adjusting device comprising:
   first range finding means of the active type for projecting a range finding light beam to the object and receiving the signal of the reflected light beam so as to set the focusing lens to an in-focus position by means of the received signal;
   second range finding means of the passive type for setting the focusing lens to an in-focus position by means of the signal of the daylight or the room light reflected from the object;

lens position detecting means for detecting the position of the focusing lens so as to produce a signal for selecting said first or said second range finding means;

object brightness detecting means for detecting the object brightness so as to produce a signal for selecting said first or said second range finding means;

timer for producing a signal at predetermined time intervals;

means for selecting said first or said second range finding means, said selecting means being arranged for receiving the outputs of said lens position detecting means and said object brightness detecting means as well as said timer so as to select said first or said second range finding means in accordance with the position of the focusing lens and the object brightness and to operate said first range finding means at a predetermined time interval in accordance with an output signal of the timer.

7. An automatic focus adjusting device according to claim 6, wherein said selecting means makes said timer produce a signal in accordance with the actuation of said automatic focus adjusting device so as to operate said first range finding means when said automatic focus adjusting device is actuated.

* * * * *